G. W. LALLY.
SIDE DUMP AUTOTRUCK.
APPLICATION FILED APR. 9, 1910.
1,024,636.
Patented Apr. 30, 1912.
3 SHEETS—SHEET 3.
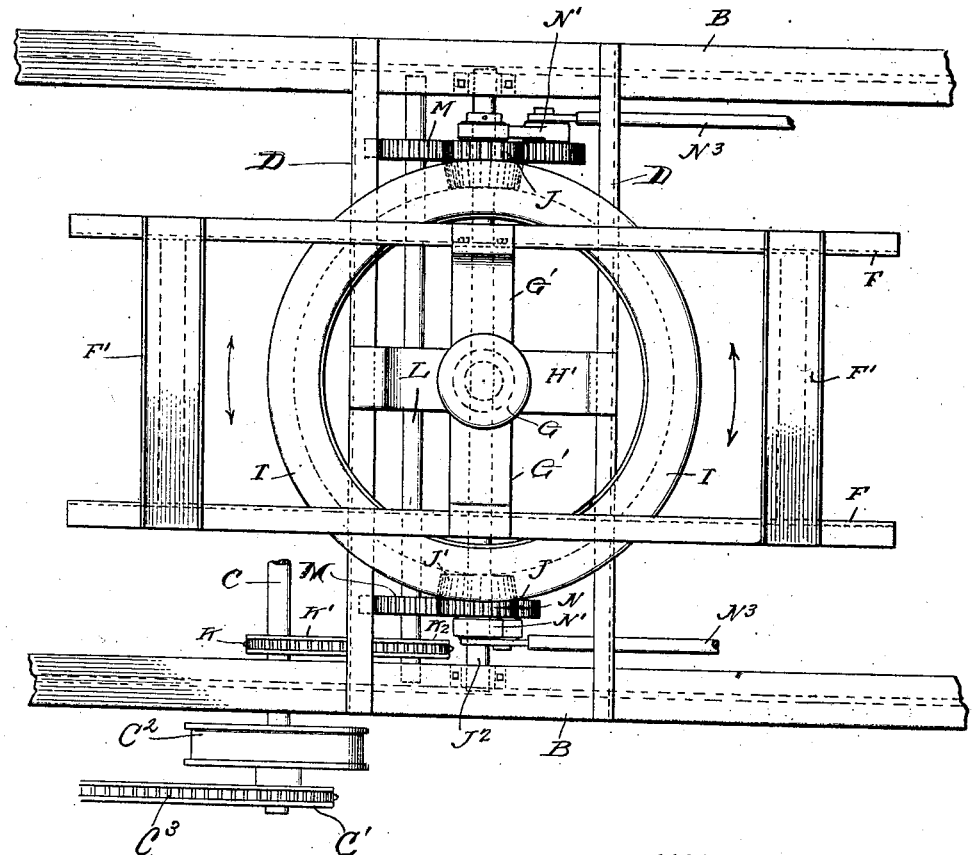
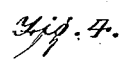
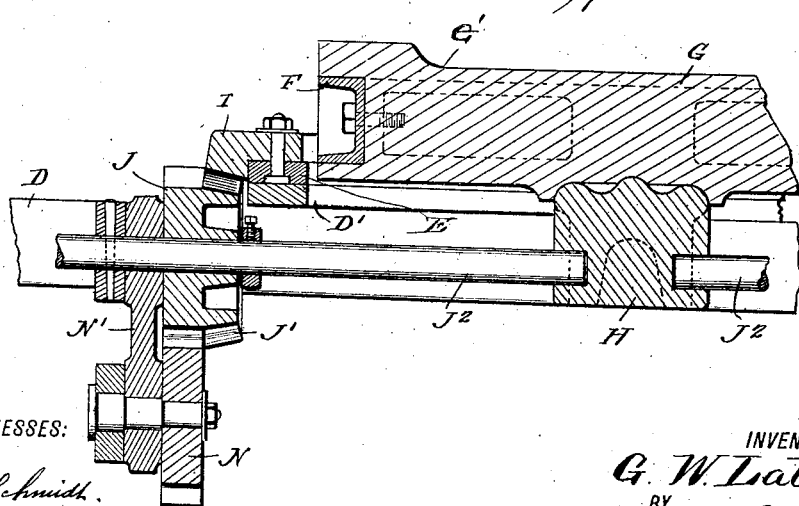
WITNESSES:
INVENTOR
G. W. Lally
BY
ATTORNEY

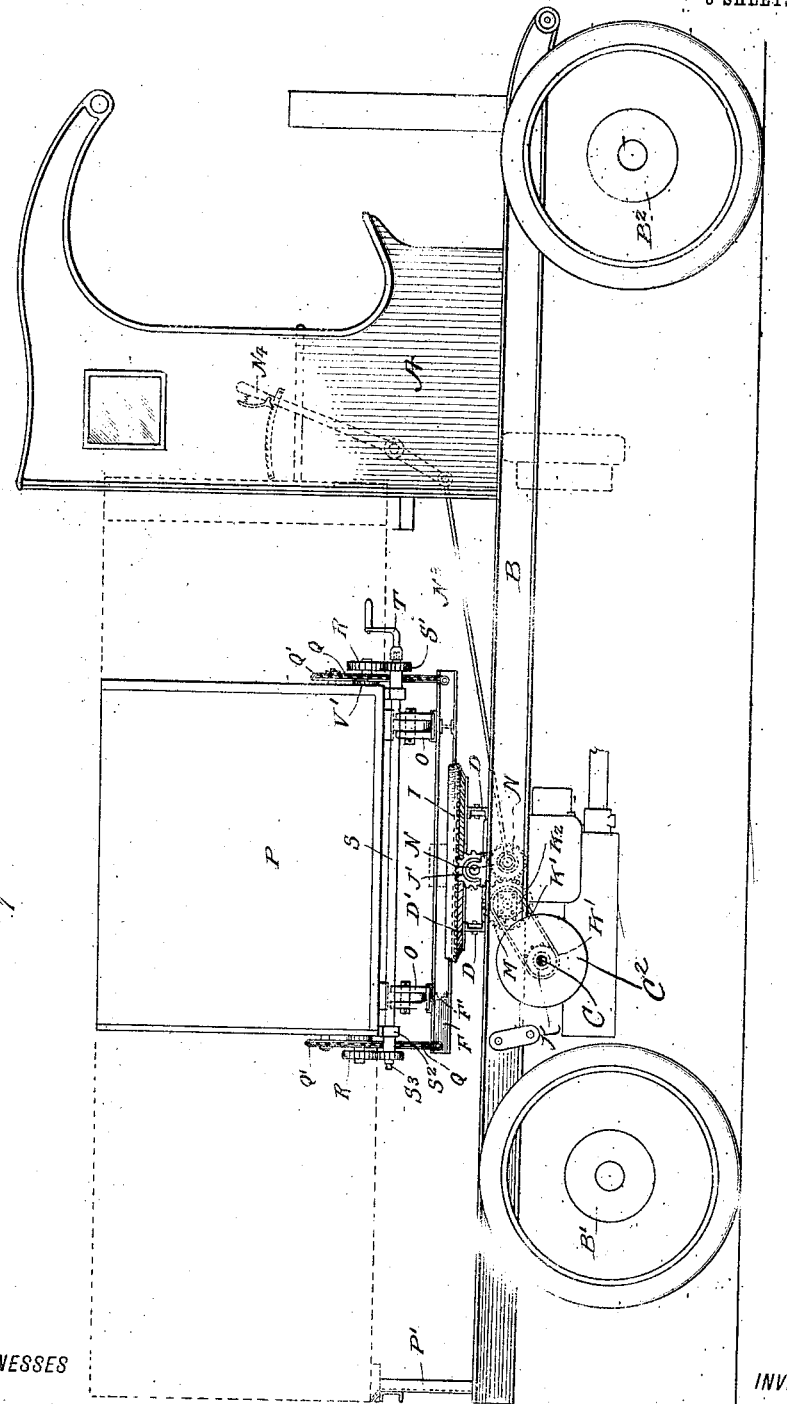

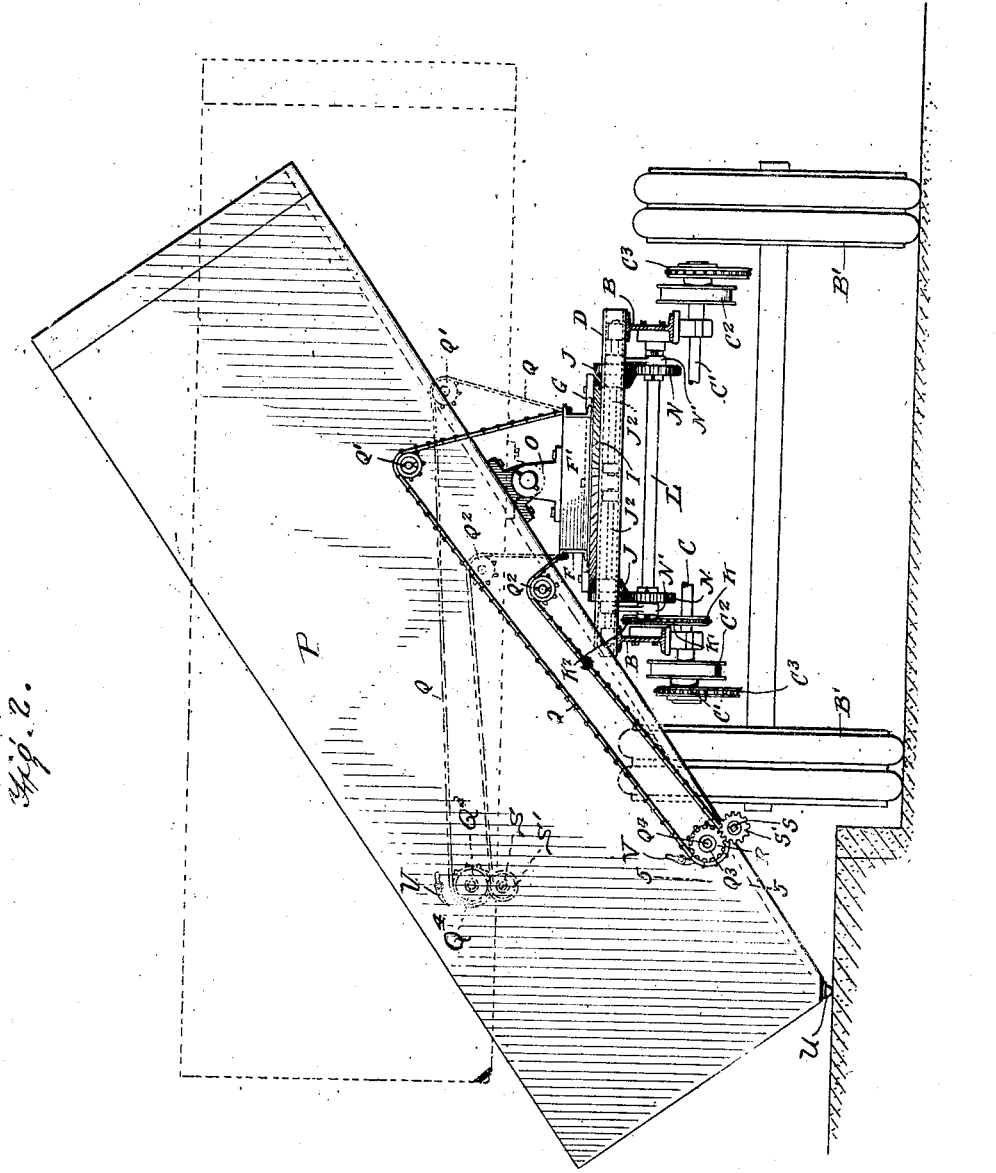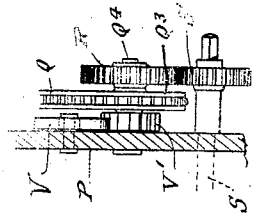

UNITED STATES PATENT OFFICE.

GEORGE WASHINGTON LALLY, OF BOSTON, MASSACHUSETTS.

SIDE-DUMP AUTOTRUCK.

1,024,636.  Specification of Letters Patent.  Patented Apr. 30, 1912.

Application filed April 9, 1910. Serial No. 554,505.

*To all whom it may concern:*

Be it known that I, GEORGE W. LALLY, a citizen of the United States, residing at Boston, in the county of Suffolk and State of Massachusetts, have invented a new and useful Improvement in Side-Dump Autotrucks, of which the following is a specification.

This invention relates to certain new and useful improvements in auto trucks, the object being to provide an auto truck with a body which is so mounted that the same can be swung transversely and tilted so as to discharge the load therefrom.

Another object of my invention is to provide novel means for mounting the body upon the truck, whereby the same can be swung transversely, so as to discharge its load from either side through the medium of gears driven by the motive power of the truck, and controlled by a lever adjacent the driver's seat.

A still further object of the invention is to provide means for allowing the body to dump after being thrown transversely of the truck, whereby the same can be allowed to drop with such force that the load will be released in such a manner that a clear discharge will be obtained, or can be let down easily by the operator.

A still further object of my invention is to provide an auto truck capable of carrying an exceedingly heavy load with great speed, whereby the delivery of coal and the like can be accomplished in about one-half of the time now required.

A further object of my invention is to provide a truck which is exceedingly strong and durable, and one in which the body is mounted upon a turn table in such a manner that the same can be readily swung and tilted in an inclined position.

With these and other objects in view, the invention consists in the novel features of construction, combination and arrangement of parts, hereinafter fully described and pointed out in the claims.

In the drawing forming a part of this specification:—Figure 1 is a side elevation of my improved auto truck, showing the body swung into a transverse position the drive shaft being in section. Fig. 2 is a rear end elevation showing the body tilted to discharge its load. Fig. 3 is an enlarged detail plan view the body being removed. Fig. 4 is a detail enlarged vertical section through the same. Fig. 5 is a detail section through the body showing the position of the pawl and ratchet.

In carrying out my improved invention I employ an auto truck A of any desirable construction comprising a frame B, supported by a rear truck B', and a front truck B² and provided with suitable engine, not shown, for driving the main drive shaft C, which carries sprockets C' controlled by frictional clutches C², said sprockets carrying chains C³ passing over the sprockets carried by the axle of the rear truck, not shown, for driving the same.

Mounted transversely on the frame B of the truck, is a pair of beams D, on which is secured a bearing ring D', on which is mounted a bearing ring E carrying a frame F, and having a female bearing member G provided with arms G', which are connected to the side bars of the frame, said female bearing member coacting with a male bearing member H, provided with arms H', which are connected to the beams D, said members forming a turn table, for the purpose hereinafter fully described.

The ring E of the turn table carries a ring gear I, which meshes with the beveled gear portion J', of oppositely disposed gears J carried by shafts J² mounted in suitable bearings arranged in the frame of the truck, and bearings formed in the male bearing member H, whereby the upper ring member and female bearing member will be rotated by the gears J', as will be later described.

The main drive shaft C carries a sprocket K, over which passes a sprocket chain K' carried by a sprocket K² fixed on a shaft L, mounted in suitable bearings carried by the frame B of the truck, and said shaft carries gears M which are adapted to be connected to the gears J by idle gears N, carried by arms N' mounted on the shaft J², and to which are connected operating rods N³, having their forward ends connected to hand levers N⁴, which are arranged upon opposite sides of the auto truck, adjacent the driver's seat, as clearly shown, so that by operating either one of the levers N⁴, one or the other of the gears M and J will be driven, so as to cause the turn table to revolve. If it is desired to turn the table in one direction, one of the levers is operated, so as to disengage the idle gear N controlled thereby, and by throwing the other idle gear N into mesh with the other gears M the table will be rotated in one direction and by reversing the operation the table will be rotated in the reverse direction.

Mounted on the cross bars or beams F' of the frame F, are pivot members O carrying a body P which is supported by suitable supports P', carried by the truck, when in its normal position, and it will be seen that when the body is swung into a transverse position, it will tilt by its own weight, and the same is pivoted to one side of its longitudinal center, so that the load will be discharged.

For controlling the tilting movement of the body, I provide a pair of retarding chains Q which have their ends connected to the frame F and pass over idle sprockets Q', $Q^2$, arranged on the sides of the body and over sprockets $Q^3$ carried by shafts $Q^4$ extending outwardly from the sides of the body, as clearly shown, the shafts carrying gears R which mesh with gears S' carried by shafts S mounted in suitable bearings $S^2$ extending downwardly from the bottom of the body, and provided with crank receiving ends $S^3$, over which is adapted to be placed a crank T for rotating the same, and it will be seen that by allowing the crank T to rotate slowly, the body can be allowed to tilt slowly in order to prevent the same from coming into engagement with the pavement with too hard a blow. The body is provided with buffers U for preventing the same from being injured, and after the load has been discharged by operating the crank T, the body can be raised back into a horizontal position.

The body is locked by pawls V which engage ratchets V', carried by the shafts $Q^4$, and it will be seen that by disengaging the pawls, when the body is thrown into a transverse position and releasing the crank, the same will drop with such force that when brought into engagement with the ground, a clear discharge will be obtained.

From the foregoing description it will be seen that I have provided an auto truck with a body which is so mounted that the load can be discharged from either side easily and quickly.

Having thus fully described my invention, what I claim as new and desire to secure by Letters Patent is:—

1. In a device of the kind described, a frame comprising parallel beams, a second frame at right angles to and above the first mentioned frame, a bearing ring mounted upon the first mentioned frame, a second ring mounted upon the first, the second mentioned ring supporting the second mentioned frame, a bearing member centrally arranged in the first mentioned frame and supported therefrom, and a second bearing member centrally arranged in the second mentioned frame, turning upon the bearing member of the first mentioned frame, and means imparting rotation to the second mentioned ring.

2. In a truck of the kind described, parallel beams mounted transversely upon the truck, a bearing ring supported upon said beams, a centrally placed bearing member having laterally extending arms secured to said beams, a second ring adapted to turn upon the first, a frame carried by said second mentioned ring, and normally at right angles to the beams, a second bearing member adapted to turn upon the first mentioned bearing member and having laterally extending arms secured to the said frame, and means for rotating the second mentioned ring, as and for the purpose set forth.

3. The combination with an auto truck, of beams mounted on the frame of the truck, a turn table mounted on said beam, carrying a ring gear, gears meshing with said ring gear, a shaft carrying gears meshing with the last mentioned gears, a power shaft for driving said shaft through the medium of sprockets and chains, and lever controlled arms carrying idle gears for connecting said gears.

GEORGE WASHINGTON LALLY.

Witnesses:
JAMES E. O'CONNELL,
ANNIE F. MARTIN.